United States Patent
Karreby et al.

(10) Patent No.: US 11,996,693 B2
(45) Date of Patent: May 28, 2024

(54) CONTROL PLATFORM ARCHITECTURE FOR GRID INTEGRATION OF LARGE-SCALE GRID ENERGY STORAGE SYSTEM

(71) Applicant: Hitachi Energy Ltd, Zürich (CH)

(72) Inventors: Per Karreby, Västerås (SE); Daniel Hallmans, Ludvika (SE); Lexuan Meng, Västerås (SE); Maria Werlefors, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/555,449

(22) PCT Filed: Apr. 14, 2021

(86) PCT No.: PCT/EP2021/059602
§ 371 (c)(1),
(2) Date: Oct. 13, 2023

(87) PCT Pub. No.: WO2022/218514
PCT Pub. Date: Oct. 20, 2022

(65) Prior Publication Data
US 2024/0088662 A1 Mar. 14, 2024

(51) Int. Cl.
*H02J 3/32* (2006.01)
*H02J 3/46* (2006.01)
*H02J 13/00* (2006.01)

(52) U.S. Cl.
CPC ................... *H02J 3/32* (2013.01); *H02J 3/46* (2013.01); *H02J 13/00019* (2020.01)

(58) Field of Classification Search
CPC .......... H02J 3/32; H02J 13/00019; H02J 3/46
(Continued)

(56) References Cited

U.S. PATENT DOCUMENTS 9,564,829 B2 * 2/2017 Häfner .................. H02M 7/537
9,929,571 B1 3/2018 Dao et al.
(Continued)

FOREIGN PATENT DOCUMENTS

EP 2904698 B1 8/2018
EP 3703241 A1 9/2020

OTHER PUBLICATIONS

International Search Report and Written Opinion for the corresponding PCT application No. PCT/EP2021/059602 dated Jan. 7, 2022, 17 pages.
(Continued)

*Primary Examiner* — Michael R. Fin
(74) *Attorney, Agent, or Firm* — Procopio, Cory, Hargreaves & Savitch LLP (57) ABSTRACT

A support system for an AC power transmission system, comprising an energy storage arrangement comprising a plurality of storage units and a main controller configured to control the operation of the energy storage arrangement. Each storage unit comprises at least three control signal connections and is configured to receive a control signal from at least three storage entities via said control signal connections, wherein each of the storage entities is either the main controller or a storage unit controller of an adjacent storage unit. The storage units are arranged to forward a control signal received via a first one of said control signal connections to all adjacent storage units that are connected via the remaining ones of said control signal connections.

14 Claims, 4 Drawing Sheets

(58) Field of Classification Search
USPC .......................................................... 307/66
See application file for complete search history.

(56) References Cited

U.S. PATENT DOCUMENTS

2014/0021924 A1  1/2014  Abe et al.
2020/0176983 A1  6/2020  Yasoshima et al.

OTHER PUBLICATIONS

International Preliminary Report of Patentability for the corresponding PCT application No. PCT/EP2021/059602 dated Mar. 28, 2023, 16 pages.

* cited by examiner

CONTROL PLATFORM ARCHITECTURE FOR GRID INTEGRATION OF LARGE-SCALE GRID ENERGY STORAGE SYSTEM

CROSS-REFERENCE TO RELATED APPLICATIONS

The present application is a national stage entry of International Patent App. No. PCT/EP2021/059602, filed on Apr. 14, 2021, which is hereby incorporated herein by reference as if set forth in full.

TECHNICAL FIELD

The present invention relates to the field of electric power transmission systems, and in particular to energy storages for use in such power systems.

BACKGROUND

Electric power systems need to provide electric power in a reliable fashion. Therefore, such technologies often comprise support systems for evening out fluctuations in voltage or frequency and for compensating for shortages and the like. Generally, the support systems may utilise energy storage systems comprising an energy storage bank having a number of series- and/or parallel-connected battery cells or supercapacitors operating an a bidirectional manner for outputting energy to the power transmission system and charging the battery cells from the same. Further, static synchronous compensators (STATCOMs) may be employed as a source or sink of reactive AC power to the power transmission network.

The battery cells of the energy storage bank, as well as the voltage source converter cells of the STATCOM, generally need to receive a control signal from a central controller in order for the support system to function properly and deliver the required support to the power transmission system. The relatively large number of components of the present support systems make them relatively complex and challenging to monitor and control, and the strive for even larger and more scalable support systems increases the demands for efficient and reliable control technologies. Thus, it would be beneficial to provide a technology for improved monitoring and control of the components included in the support systems.

SUMMARY

Thus, it would be advantageous to achieve a support system overcoming or at least alleviating the above-mentioned drawbacks. In particular, it would be desirable to provide a support system allowing for improved performance, redundancy and fault tolerance.

These objects, among other, may be achieved by a support system as claimed in the appended independent claim.

Hence, according to an aspect a support system for an alternating current, AC, power transmission system is provided. The system comprises an energy storage arrangement comprising a plurality of interconnected storage units. The energy storage arrangement is configured to output power to the AC power transmission system and to charge the storage units with power from the AC power transmission system. The system further comprises a main controller configured to control the operation of the energy storage arrangement. At least some of the storage units comprises at least three control signal connections and a storage unit controller configured to control the operation of the storage unit, wherein the at least three control signal connections are connected to the storage unit controller. The storage units are thus configured to receive a control signal from at least three storage entities via the at least three control signal connections. Each of the at least three storage entities is either the main controller or a storage unit controller of an adjacent storage unit, and each of the storage units is arranged to forward a control signal received via a first one of the at least three control signal connections to all adjacent storage units that are connected via the remaining ones of the at least three control signal connections.

The present aspect allows for a control signal from the main controller to be relayed in different ways through the arrangement of energy storage units. A first storage unit, comprising at least three control signal connections, may receive the control signal from the main controller and forward the control signal to at least two other storage units of the arrangement. One, or both of those two storage units may in turn forward the control signal to one or two further storage units, etcetera. The storage units may hence be considered to be arranged in a mesh, allowing for the control signals to be relayed along several different paths through the arrangement.

The first control unit may be directly connected to the main controller and configured to forward the control signal to at least two other control units that are not directly connected to the main control unit. In this way, a control signal from the main control unit may efficiently flood the storage units of the energy storage arrangement even if the main control unit is connected to only one or two of the storage units. The at least three control signal connections provided at some or all of the storage units allow for the control signal to take different paths through the arrangement, and consequently to be propagated also in case of faults in one of several of the storage units. Thus, the present aspect provides for an improved redundancy and resistance to faults which may affect one or more of the storage units, especially when compared to technologies relying on a point-to-point communication or a strict series connection between the storage units. Further, the support system can relatively easily be extended with more components, such as energy storage units or STATCOM devices, by adding more nodes to the network topology formed by the above-described control signal connections. Additional control units may also be added to complement the support system.

Each one, or at least some of the storage units may be configured to forward a received control signal to all connected adjacent storage units (and the main control unit, if connected to one of the control signal connections). Further, the storage units may be configured to perform this action of control signal forwarding autonomously, without external control.

By "adjacent" storage units may, in the context of the present application, be understood storage units that are communicatively coupled directly to each other, i.e., without any intermediate storage unit through which the control signal has to pass on its way between the adjacent storage units. In other words, adjacent storage units may be capable of exchanging a control signal with each other without the control signal first having to pass through another storage unit. "Adjacent", "neighbouring" and "next" may be used interchangeably in the present disclosure to describe the arrangement of two storage units that are communicatively connected in such a manner that a control signal is allowed to pass directly between the storage units without passing through any intermediate storage unit.

The components receiving and forwarding the control signals (such as the main controller, the storage unit and, optionally, STATCOM converter units) within the support system may be understood as nodes of a communication network, linked via the control signal connections. While the physical topology of such a network may refer to the actual placement of the storage units and other components of the support system, the logical topology, or network topology, may describe how data flows within the support system. In the following discussion of the configuration of the control signal connections, the examples generally refer to the logical topology rather than the physical ditto.

It will be appreciated that the support system may comprise additional storage units, which may comprise only one, or only two, control signal connections. The support system may hence not be limited to an arrangement in which each and every storage unit comprises exactly three control signal connections, or more than three control signal connections. Rather, the support system may further comprise one or more storage units (or nodes) that are connected to exactly one other storage unit (or node), or one or more storage units that are connected to exactly two other storage units, as well as one or more storage units that are connected to four or more other storage units. Thus, in some examples one or several of the storage units of the support system may comprise four or five or more control signal connections.

The control signal connections may hence allow for the nodes of the support system to be arranged in a meshed topology, which allows for the control signals to be relayed using either a routing technique, or more preferably a flooding technique in which in a received signal is sent through every control signal connection except the one it arrived on.

Hence, according to an embodiment, a first and a second one of the at least three control signal connections of each of the plurality of storage units may be configured to connect the plurality of storage units in a series connection, or a daisy chain. Further, a third one of the at least three control signal connections may be configured to short-cut the daisy chain, i.e., to connect the storage unit to a storage unit that is not an adjoining or adjacent storage unit in the daisy chain. Shortcutting one or several of the storage units in the daisy chain may allow for a reduced delay of the control signal. Passing through a storage unit is generally associated with a delay, and by omitting one or several storage units when relaying the control signal, the total delay may be reduced accordingly. This may be of particular interest when relaying high-priority messages, such as for example blocking messages or trip messages. Further, the shortcut may allow for a control signal to be propagated via another path in case of a fault in a storage unit of the daisy chain.

According to an embodiment, the daisy chain may be arranged according to a linear topology or a ring topology. A ring topology may be advantageous in that a control signal may be transmitted in two different directions of the ring.

According to an embodiment, a first one of the storage units may be directly connected to the main controller. In other words, the first one of the storage units may be configured to receive a control signal from the main controller, which has not been relayed by any intermediate storage unit. The first one of the storage units may in some examples be connected to only two adjacent storage units, while storage units not directly connected to the main controller may, in such an example, be connected to three or more adjacent storage units.

According to an embodiment, at least some, or each of the control signal connections may be a bidirectional connection.

According to an embodiment, the control signal connections may be configured to communicate via an optical communication channel, such as a communication channel comprising an optical fibre.

According to an embodiment, each of the plurality of storage units may be configured to detect a high priority message comprised in the control signal, and to forward the high priority message without fully decoding the control signal. The high priority message may be a message supplied to the control signal connections separately from other messages supplied to the control signal connections. The high priority message may for example comprise a tripping instruction, or blocking instructions, causing a specific storage unit or all storage units to disconnect. By detecting the high priority message separately, the high priority message can be detected faster than if a complete, regular message decoding would be used. This allows for the high priority message to be relayed quicker and thus propagate to all storage units quicker.

The storage units may be operably connected to each other in series and/or in parallel, for example depending on the desired voltage to be achieved. A storage unit may comprise one or several energy storage cells, which for example may be formed of a battery cell or a capacitor cell. A storage unit may in some examples be identical to a single energy storage cells, and may in other examples comprise a plurality of energy storage cells forming an energy storage rack. By the term "energy storage cell" may generally be understood a device capable of accepting electric energy, storing electric energy and releasing electric energy. Thus, the energy storage cell may refer to a device that is capable of repeatedly being (re)charged. Examples of such devices include supercapacitors, flywheels and batteries.

A group of interconnected energy storage units may be referred to as an energy storage string, and a plurality of strings may be grouped into an energy storage bank. It is thus to be noted that various configurations and combinations of energy storage units and energy storage cells are conceivable within the scope of the claims.

According to an embodiment, the storage unit controller may be configured to form an interface to a control system, which may be internal to the rack. The rack-internal control system may be configured to control the energy storage cells of the rack. Alternatively, or additionally, the storage unit controller may be configured to directly control each energy storage cell of the energy storage rack.

According to an embodiment, there may be provided a battery management control system (BMS) for managing one or several storage units, and in particular the energy storage cells of the unit(s). The BMS may for example be provided to protect the cells from operating outside their safe operating area, monitoring their state, and balance the operation of the cells. According to the present embodiment, the storage unit controller may be configured to control the BMS. In some examples, the above-mentioned rack-internal control system may comprise a BMS.

According to an embodiment, some or each of the plurality of storage units may comprise a power converter, such as a voltage-source converter (VSC), that may be controlled by the storage unit controller. The power converter may be configured to output power from one or several of the energy storage units to the power transmission system and to charge the storage module with power from the power transmission system. Thus, the power converter may be a bidirectional converter. The storage unit controller may be operatively connected to the power converter and may hence control the operation of the power converter based on the received control signals. The storage unit controller may further be configured to disconnect the storage unit from other storage units of the energy storage arrangement.

According to an embodiment, the support system may further comprise a converter arrangement comprising a plurality of interconnected converter units configured to be functionally arranged between the energy storage arrangement and the AC power transmission system to act as static synchronous compensator, STATCOM. The support system may further comprise a converter arrangement controller configured to control the operation of the converter arrangement. The converter arrangement may be controlled in a similar way as the energy storage arrangement discussed above with reference to any of the previous embodiments. Thus, each converter unit of the plurality of converter units may comprise at least three control signal connections and a converter unit controller configured to control the operation of the converter unit, wherein each converter unit of the plurality of converter units may be configured to receive a control signal from at least three converter entities via the at least three control signal connections. Each of the at least three converter entities may be either the converter arrangement controller or a converter unit controller of an adjacent converter unit, and each converter unit of the plurality of converter units may be arranged to forward a control signal received via a first one of the at least three control signal connections to all adjacent converter units connected via the remaining ones of the at least three control signal connections.

It will be appreciated that the converter arrangement according to the present embodiment hence may allow for a control signal from the converter arrangement controller to be relayed in different ways through the arrangement of converter units, similar to how the control signals may be propagated through the arrangement of energy storage units according to any of the previous embodiments and examples. Thus, a first converter unit receiving the control signal from the converter arrangement controller may relay the control signal to at least two other converter units of the arrangement. One, or both of those converter units may in turn forward the control signal to at least two further converter units, etcetera. The control signal connections of the converter arrangement may hence allow for the converter units to be arranged in a mesh, similar to the storage units of the energy storage arrangement, allowing for a control signal from the converter arrangement controller to efficiently flood the converter units of the converter arrangement.

It will be appreciated that the support system may comprise additional converter units, which may comprise only one, or only two, control signal connections. The support system may hence not be limited to a converter arrangement in which each and every converter unit comprises exactly three control signal connections, or more than three control signal connections. Rather, the converter arrangement may further comprise one or more converter units (or nodes) that are connected to exactly one other converter unit (or node), or one or more converter units that are connected to exactly two other converter units, as well as one or more converter units that are connected to four or more other converter units. Thus, in some examples one or several of the converter units of the support system may comprise four or five or more control signal connections.

According to an embodiment, the support system may comprise a coordinated controller configured to control the main controller and the converter arrangement controller. The coordinated controller may be structurally distinct from the main controller and/or the converter arrangement controller. In other examples, the tasks of the main controller and/or the converter arrangement controller may be performed by the coordinated controller, and the main controller and/or the converter arrangement controller may hence be structurally integrated with the coordinated controller.

The converter arrangement may for example comprise a modular multilevel chain-link converter, MMC, arrangement or a 2 or 3 level converter arrangement.

A combined support system as outlined above, providing both an energy storage functionality and a STATCOM functionality, advantageously allows for an improved control of the power flow between the support system and the AC power transmission system. While the STATCOM functionality compensates the reactive power, the energy storage functionality allows for a control of the active power flow between the STATCOM and the AC power transmission system. Thus, active and reactive power absorption and injection from/into the grid is allowed by the same support system. The combined support system further allows for an improved and joint control of the components forming the energy storage arrangement and the converter arrangement providing the STATCOM functionality.

The term "control unit", or "controller", may be understood as a device that is capable of receiving information pertaining to a condition, state or operation or components of the energy storage arrangement and/or STATCOM arrangement as disclosed herein, and/or outputting instructions for controlling the operation of such components. The control unit may be structurally integrated in the energy storage arrangement or the STATCOM arrangement, or arranged physically remote from these arrangements.

By "AC power transmission system" is generally meant a structure for transmission and/or distribution of electric power. The AC power transmission system may in some examples be referred to as an electric power transmission network, a transmission network, a power grid, or a grid.

It is noted that embodiments and examples of the invention relate to all possible combinations of features recited in the claims. Further, it will be appreciated that the various embodiments described for the energy storage arrangement may be combined with embodiments described for the STATCOM arrangement.

BRIEF DESCRIPTION OF THE DRAWINGS

The inventive concept will now be described, by way of example, with reference to the accompanying drawings, in which.

All the figures are schematic, not necessarily to scale and generally only show parts which are necessary to elucidate the embodiments, wherein other part may be omitted or merely suggested. Like reference numerals refer to like elements through the description.

DETAILED DESCRIPTION

The inventive concept will now be described more fully hereinafter with reference to the accompanying drawings, in which currently preferred embodiments are shown.

Figure 1:
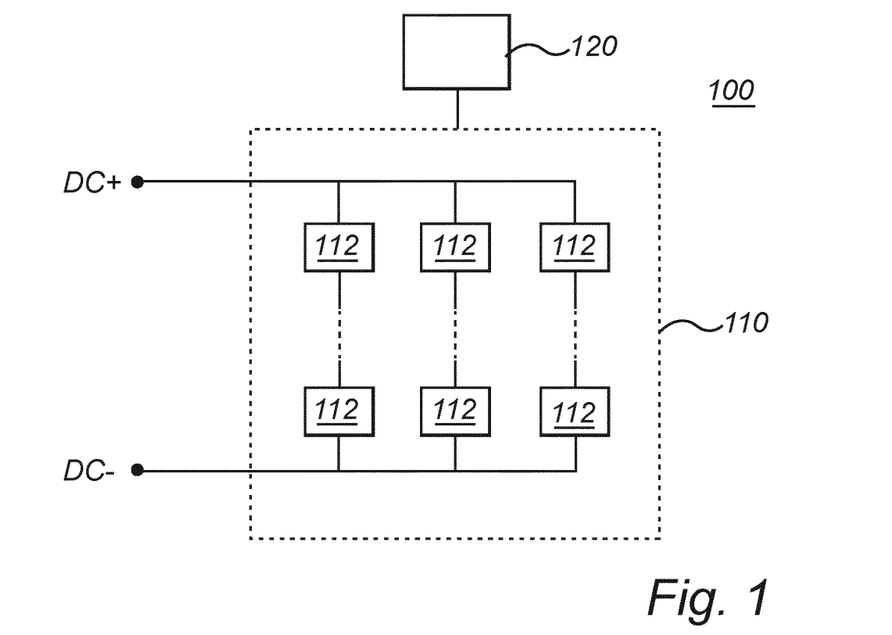
FIG. 1 is a schematic diagram illustrating a support system comprising an energy storage arrangement according to an embodiment.

A support system 100 for an AC power transmission system will now be described with reference to FIG. 1, illustrating an energy storage arrangement 110 controlled by a main controller 120. The energy storage arrangement 110 may comprise a plurality of interconnected energy storage units 112, which may be configured to be charged by electrical energy supplied from the AC power transmission system and to discharge stored energy to the AC power transmission system (also referred to as a grid). A power converter (shown in FIG. 2) may be arranged between the storage units 112 and the grid so as to transmit the electrical power between the storage units 112 and the grid. The energy storage arrangement 110 may comprise a positive DC terminal and a negative DC terminal, which for example may form an HVDC connection.

Figure 2:
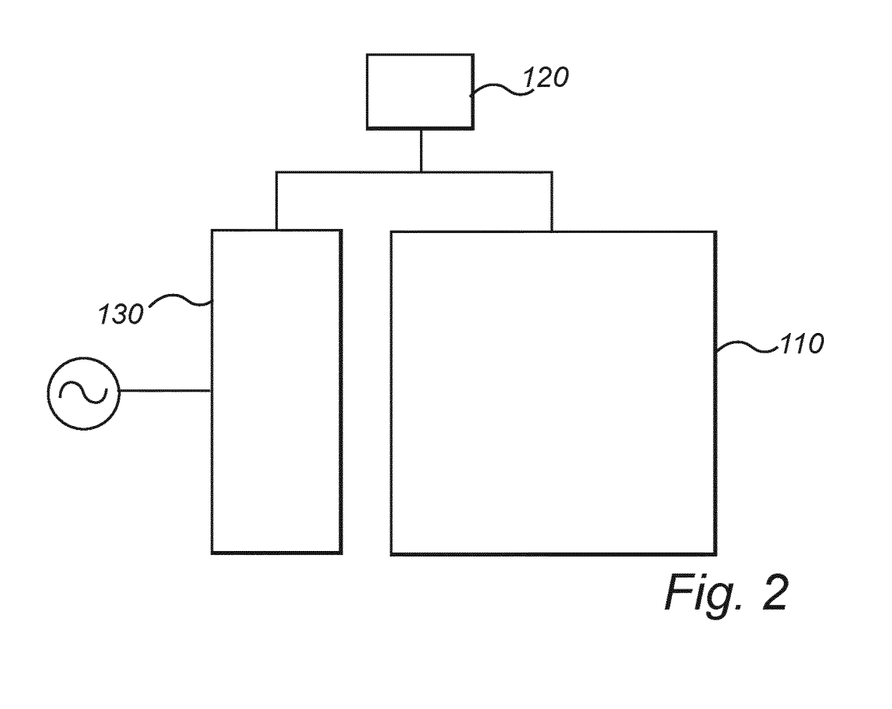
FIG. 2 is a schematic diagram illustrating a support system comprising an energy storage arrangement and a power converter according to an embodiment.

FIG. 2 shows an example of a support system 100, which may be similarly configured as the support system disclosed in FIG. 1. FIG. 2 is a schematic diagram of a support system 100 comprising an energy storage unit 110 as discussed above, and a power converter 130, such as a voltage-source converter (VSC) employing transistors, such as insulated-gate bipolar transistors (IGBT) for converting DC into AC, and vice versa. Thus, the power converter 130 may have a DC side coupled to the energy storage arrangement 110, and an AC side coupled to the AC power transmission system. The operation of the power converter 130 may be controlled by means of the main controller 120, which hence may be operatively coupled to both the energy storage arrangement 110 and the power converter 130.

Figure 3:
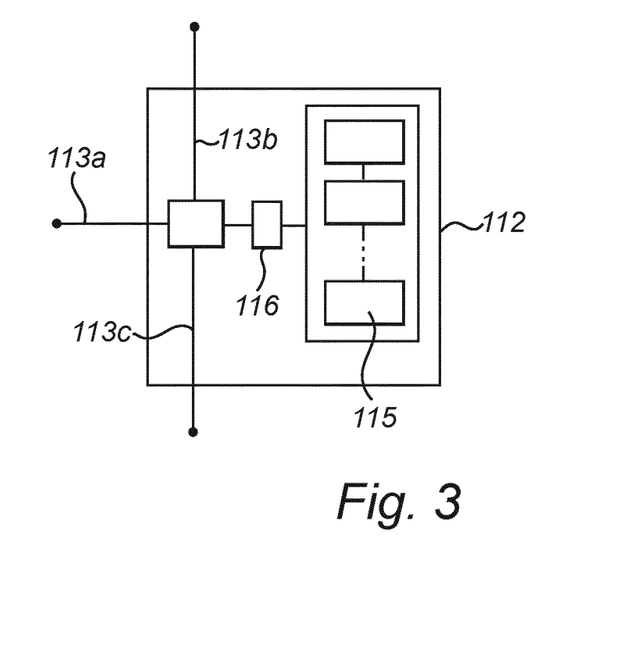
FIG. 3 is a schematic diagram illustrating a storage unit of an energy storage arrangement according to an embodiment.

A storage unit 112 of the energy storage arrangements 110 shown in FIGS. 1 and 2 may comprise one or several energy storage cells 115, comprising for example a battery or a capacitor, as shown in FIG. 3. The energy storage cells 115 may be connected in parallel or series to form a rack, which in turn may be interconnected into a string. It will be appreciated that there are several different ways of interconnecting and organising the energy storage units 112 or energy storage cells 115 within the energy storage arrangement 110, and that a storage controller 114 may be configured to control one or several of the energy storage cells 115 and/or units 112.

FIG. 3 further illustrates a control system 116 internal to the storage unit 112. The control system may for example comprise a battery management system (BMS) 116, which may be provided for managing one or several cells 115 of the storage unit 112. Further, according to some examples the BMS 116 may be configured to manage two or more energy storage units 112. In some examples, the control system 116 may be common to a rack formed by a plurality of interconnected storage cells 115. Such a control system 116 may thus be referred to as a rack-internal control system 116. The control system, such as the BMS 116 may be provided to protect the cells 115 from operating outside their safe operating area, monitoring their state, and balance the operation of the cells 115. The storage unit controller 114 may in some examples be configured to from an interface with the internal control system, such as the BMS 116, and to control such as system via the interface.

The storage unit 112 may further comprise at least three control signal connections 113*a*, 113*b*, 113*c* that may be communicatively connected to the storage unit controller 114. The storage unit 112 may be configured to receive a control signal from at least three storage entities via the at least three control signal connections 113*a*, 113*b*, 113*c*. Each of the at least three storage entities may be either the main controller 120 or a storage unit controller 114 of an adjacent storage unit 112. This allows for the storage unit 112 to receive a control signal via a first one of the control signal connections 113*a*, 113*b*, 113*c* and relaying the control signal to the adjacent storage units 112 via the remaining ones of the control signal connections 113*a*, 113*b*, 113*c*. The control signal connections may be configured to communicate via an optical communication channel, interconnecting adjacent storage units 112 of the energy storage arrangement 110 and further connecting the energy storage arrangement 110 to the main controller 120.

The control signal connections 113*a*, 113*b*, 113*c* may be bidirectional connections, capable of transmitting a control signal in both directions. A control signal may convey information pertaining to the operation and monitoring of the energy storage arrangement 110. Examples of information included in the control signal may for example relate to characteristics of the electrical power supplied to the storage unit 112 or to be discharged from the storage unit 112, temperature of the storage cells, trip commands, etcetera. The storage unit 112 may be configured to relay the received control signal autonomously, without additional external control. Further, the storage unit 112 may be configured to detect a high priority message comprised in the received control signal and to forward the high priority message without fully decoding the control signal.

The at least three control signal connections 113*a*, 113*b*, 113*c* allow for the storage units 112 to be communicatively interconnected in a meshed topology, which allows for the control signals to be relayed using either a routing technique, in which the control signals may be forwarded through different paths that may vary depending on the current status of the network nodes formed by the storage entities (such as the storage units 112 and the main controller 120), or more preferably a flooding technique in which in a received signal is sent through every control signal connection except the one it arrived on.

Figure 4A:
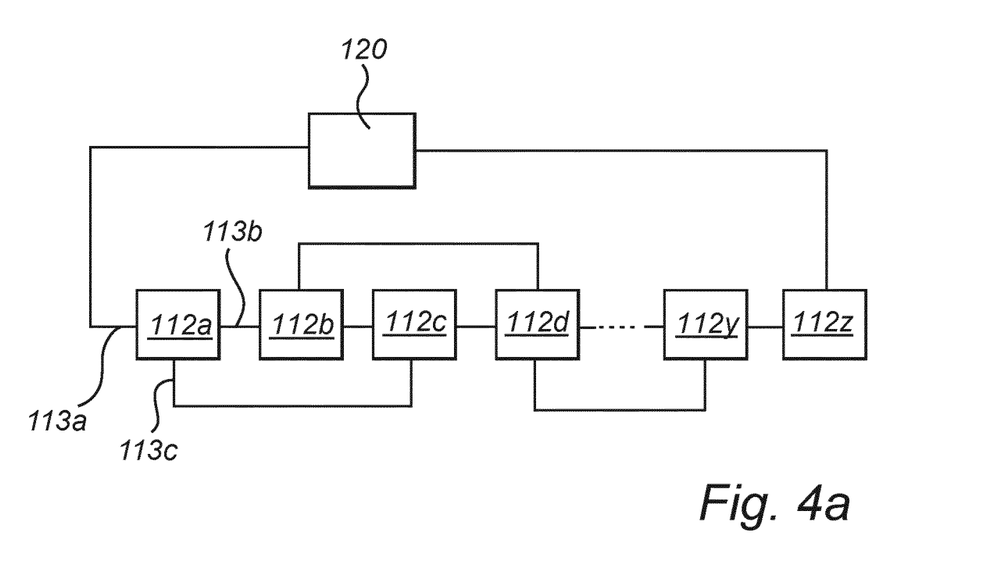
FIGS. 4*a* and 4*b* are schematic diagrams illustrating the communicatively coupling between storage units according to an embodiment.
Figure 4B:
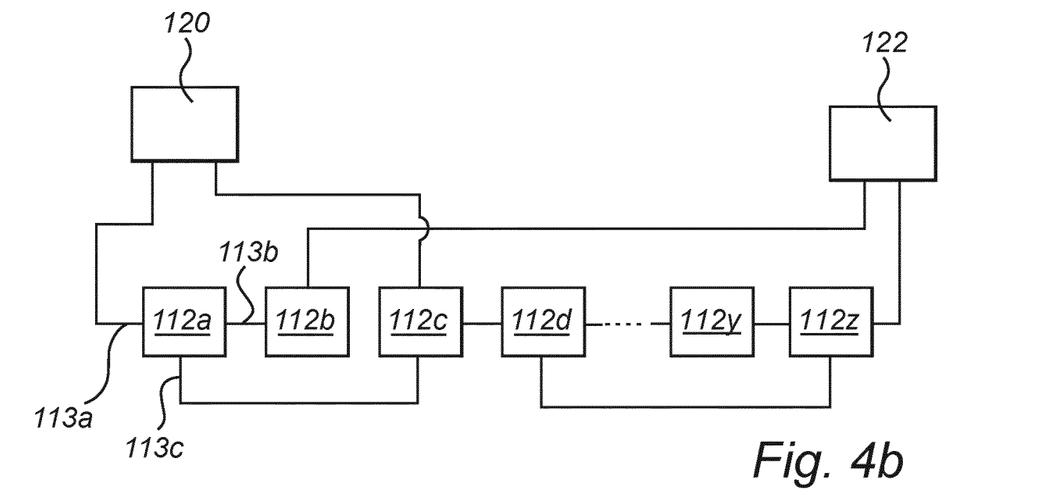

FIGS. 4*a* and 4*b* are schematic diagrams illustrating the communicative coupling between a plurality of storage units 112*a-z* (collectively referred to as 112*n*) of an energy storage arrangement 110 according to some embodiments, which may be similarly configured as the ones described with reference to any of the previous figures. In FIG. 4*a*, two of the control signal connections 113*a*, 113*b* of each storage unit 112*n* are configured to series-connect the storage units 112*n* in an array having a daisy chain topology. As illustrated in the present figure, a first storage unit 112*a* and a last storage unit 112*z* in the array may be connected to the main controller 120 and the adjacent storage unit 112*n* in the array, whereas the remaining storage units 112*n* may be connected to the two adjacent storage units in the array. The series-connected array may also be referred to as a backbone network.

Further, some of the storage units 112n may comprise a third control signal connection 113c configured to short-cut the daisy chain, and hence allow for the control signal to be relayed to a non-adjacent storage unit 112n. In the example illustrated in FIG. 4a, storage unit 112a comprises a third control signal connection 113c providing a shortcut connection to storage unit 112c, so that the control signal can be relayed directly to storage unit 112c without passing through the intermediate storage unit 112b of the daisy chain. A similar, third control signal connection is provided at storage unit 112b, connecting storage unit 112b directly to the non-adjacent storage unit 112d. It will be appreciated that the storage units 112n are not necessarily limited to three control signal connections 113a, 113b, 113b. Some of the storage units 112n may comprise further control signal connections, such as a fourth control signal connection as indicated for storage unit 112d.

FIG. 4b shows a similar arrangement as in FIG. 4a, with the difference that the storage units 112n are not series-connected in a backbone network. Instead, a meshed topology is provided, wherein a first storage unit 112a is connected (via a first control signal connection 113a) to the main controller 120 and to two other storage units—i.e., a second storage unit 112b and a third storage unit 112c—via a second and third control signal connection 113b, 113c. Further, the second storage unit 112b comprises only two control signal connections, connecting the second storage unit 112b to the first storage unit 112a and an additional controller 122. The additional controller 122 may be provided to increase redundancy of the arrangement and may for example be operated in a hot standby mode that allows for the additional controller 122 to take over in case of failure of the main controller 120, or primary controller. The additional controller 122 may hence function as a backup to the main controller. Preferably, data from the storage units 112n are mirrored in real time between the main controller 120 and the additional controller 122.

Figure 5:
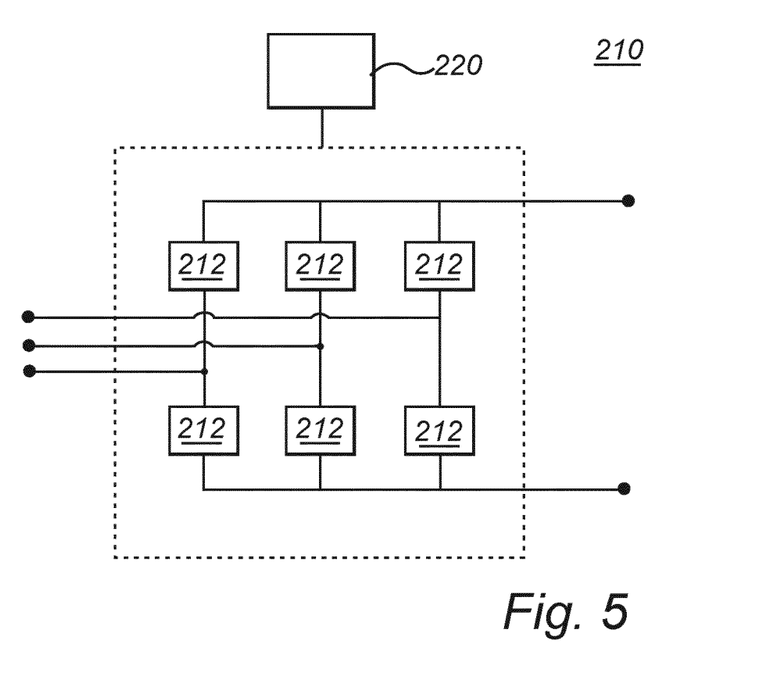
FIG. 5 is a schematic diagram illustrating a STATCOM arrangement arrangement according to an embodiment.

FIG. 5 is a schematic diagram illustrating a converter arrangement, such as a modular multilevel converter, MMC, arrangement 210 comprising a plurality of interconnected converter units 212 configured to be functionally arranged between the energy storage arrangement 110 and the AC power transmission system to act as a STATCOM. Further, an MMC arrangement controller 220 may be provided to control the operation of the MMC arrangement 210. Similar to the above embodiments relating to the energy storage arrangement 110, at least some of the converter units 212 may comprise at least three control signal connections 213a, 213b, 213c, through which the converter units 212 may receive a control signal from at least three converter entities, and a converter unit controller 214 for controlling the operation of the converter unit 212. Each of the at least three converter entities may be either the MMC arrangement controller 220 or a converter unit controller 214 of an adjacent converter unit 212. Similar to the storage units 112, the converter units 212 may be configured to forward a control signal received via a first one of the control signal connections 213a, 213b, 213c to all adjacent converter units 212 connected via the remaining ones of the control signal connections 213a, 213b, 213c.

The MMC arrangement 210 may comprise a DC side, comprising a positive DC terminal and a negative DC terminal configured to be electrically coupled to the corresponding terminals of the energy storage unit 110 as discussed above with reference to any of FIGS. 1-4, as well as an AC side configured to be electrically coupled to the AC power transmission system.

The MMC arrangement controller 220 may be configured to operate the MMC arrangement as a STATCOM for improving transient stability by compensating the reactive power at the point of connection to the AC power transmission system. The converter units 212, which also may be referred to as switching cells, may for example comprise a half bridge structure or a full bridge structure, wherein the actively controlled components may be switches such as for example insulated-gate bipolar transistors (IGBTs), insulated gate-commutated thyristors (IGCTs), gate turn-off thyristors (GTOS), or the like.

Figure 6:
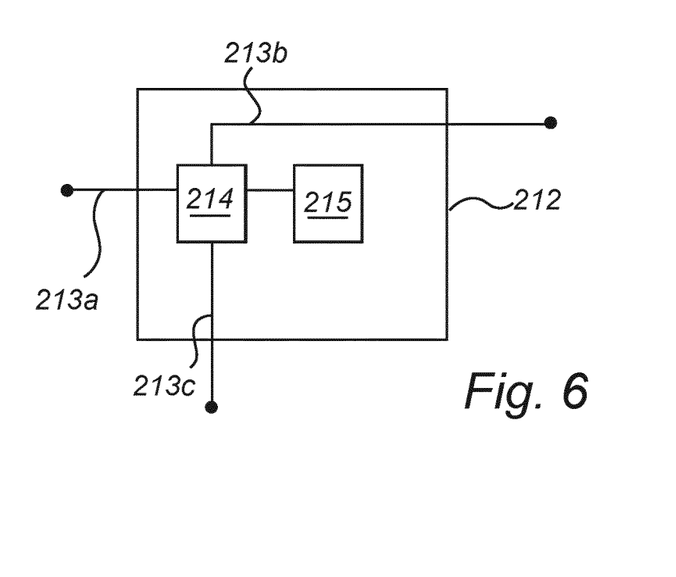
FIG. 6 is a schematic diagram illustrating a converter unit of a STATCOM arrangement according to an embodiment.

FIG. 6 is a schematic diagram of a converter unit 212 of the MMC arrangement 210 of FIG. 5, comprising a converter unit controller 214 operatively coupled to the active components 215 of the converter unit 212, such as the controllable valves 215. The converter 212 of the present example comprises at least three control signal connections 213a, 213b, 213c which may be connected to the converter unit controller 214 for providing the converter unit controller 214 with instructions for operating the valves 215. The converter unit 212 may be configured to receive a control signal via a first one of the control signal connections 113a, 113b, 113c and relaying the control signal to the adjacent storage units 112 or the MMC arrangement controller 220, as outlined above in connection with FIG. 5.

Similar to the energy storage arrangement 210, the at least three control signal connections 213a, 213b, 213c of at least some of the converter units 212 allow for the control signals to be relayed through the plurality of converter units 212 using either a routing technique, in which the control signals may be forwarded through different paths that may vary depending on the current status of the network nodes formed by the converter entities (such as the converter units 212 and the MMC arrangement controller 220), or a flooding technique in which a received signal is sent through every control signal connection except the one it arrived on. Similar network topologies as discussed with reference to FIGS. 4a and 4b may be applied.

Figure 7:
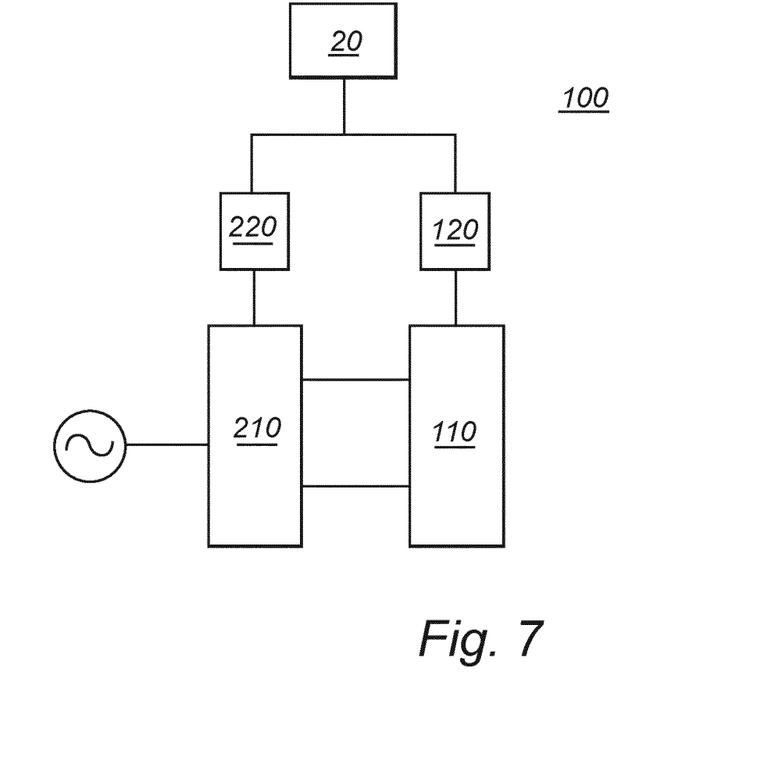
FIG. 7 is a schematic diagram illustrating a support system comprising an energy storage arrangement and a STATCOM arrangement according to an embodiment.

FIG. 7 is a diagram outlining a support system 100 according to an embodiment, comprising converter arrangement 210 (also referred to as a STATCOM) that is powered by an energy storage arrangement 110. The converter arrangement 210 and the energy storage arrangement 110 may be similarly configured as any of the embodiments discussed above in connection with the previous figures. The support system 100 may further comprise a coordinated controller 20, which may be configured to control the operation of both the STATCOM functionality 210 and the energy storage functionality 110. The coordinated controller 20 may in some examples perform the control via intermediate controllers, such as a main controller 120 and/or a converter arrangement controller 220 as described in connection with the previous embodiment. The main controller 120 and the converter arrangement controller 220 may be communicatively connected to the coordinated controller 20 as indicated in the present figure. Alternatively, the main controller 120 and/or the converter arrangement controller 220 may be omitted, such that the coordinated jointly and directly controls the energy storage arrangement 110 and/or the converter arrangement 210. The present support system 100 may combine the advantages of the STATCOM functionality and the energy storage functionality. Thus, the combined system 100 indicated in FIG. 7 may operate as a STATCOM that is supported by an energy storage system to allow for the coordinated controller 20 to control the flow of both reactive and active power between the support system 100 and the AC power transmission system.

The invention claimed is:

1. A support system for an alternating current, AC, power transmission system, comprising:
    an energy storage arrangement comprising a plurality of interconnected storage units (112), wherein the energy storage arrangement is configured to output power to the AC power transmission system and to charge the storage units with power from the AC power transmission system; and
    a main controller configured to control the operation of the energy storage arrangement;
    wherein each storage unit of the plurality of storage units comprises at least three control signal connections and a storage unit controller configured to control the operation of the storage unit, wherein the at least three control signal connections are connected to the storage unit controller;
    wherein each of the storage units is configured to receive a control signal from at least three storage entities via said control signal connections;
    wherein each of said storage entities is either the main controller or a storage unit controller of an adjacent storage unit; and
    wherein each of the storage units is arranged to forward a control signal received via a first one of said control signal connections to all adjacent storage units that are connected via the remaining ones of said control signal connections;
    wherein the support system further comprises:
    a converter arrangement comprising a plurality of interconnected converter units configured to be functionally arranged between the energy storage arrangement and the AC power transmission system to act as static synchronous compensator, STATCOM; and
    a converter arrangement controller configured to control the operation of the converter arrangement;
    wherein each converter unit comprises at least three control signal connections and a converter unit controller configured to control the operation of the converter unit;
    wherein each converter unit is configured to receive a control signal from at least three converter entities via said control signal connections;
    wherein each of said converter entities is either the converter arrangement controller or a converter unit controller of an adjacent converter unit; and
    wherein each converter unit is arranged to forward a control signal received via a first one of said control signal connections to all adjacent converter units connected via the remaining ones of said control signal connections.

2. The support system according to claim 1, wherein the at least three control signal connections of each storage unit are configured to connect the storage units in a mesh topology.

3. The support system according to claim 1, wherein a first and a second one of the control signal connections of each storage unit are configured to connect the storage units in a daisy chain, and wherein a third one of the control signal connections is configured to short-cut the daisy chain.

4. The support system according to claim 3, wherein the daisy chain is arranged according to linear topology or a ring topology.

5. The support system according to claim 1, wherein a first one of the storage units is directly connected to the main controller.

6. The support system according to claim 1, wherein each of the control signal connections is a bidirectional connection.

7. The support system according to claim 1, wherein each of the control signal connections is configured to communicate via an optical communication channel.

8. The support system according to claim 1, wherein each storage unit is configured to detect a high priority message comprised in the control signal and to forward the high priority message without fully decoding the control signal.

9. The support system according to claim 1, wherein each storage unit comprises a plurality of energy storage cells forming an energy storage rack.

10. The support system according to claim 9, wherein the storage unit controller is configured to directly control each energy storage cell of the energy storage rack.

11. The support system according to claim 9, wherein the storage unit controller is configured to form an interface with a rack-internal control system.

12. The support system according to claim 1, wherein the rack-internal control system comprises a battery management system, BMS.

13. The support system according to claim 1, wherein at least one of the plurality of storage units further comprises a voltage-source converter (130) configured to be controlled by the storage unit controller.

14. The support system according to claim 1, further comprising a coordinated controller configured to control the main controller and the converter arrangement controller.

* * * * *